Feb. 3, 1970  J. R. DITZER, JR., ET AL  3,492,925
COLOR IMAGE TRANSFER PRINTS FOR VIEWING BY EITHER
REFLECTED OR TRANSMITTED LIGHT
Filed March 6, 1967
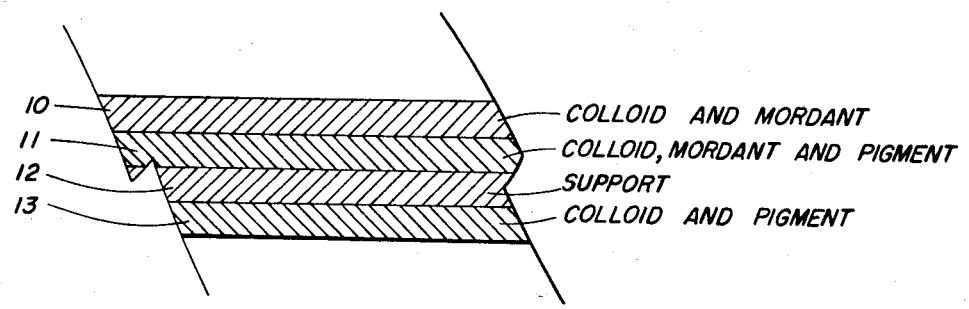
FRED W. SPANGLER
JOSEPH R. DITZER
INVENTORS
BY
ATTORNEYS

United States Patent Office 3,492,925
Patented Feb. 3, 1970

3,492,925
COLOR IMAGE TRANSFER PRINTS FOR VIEWING BY EITHER REFLECTED OR TRANSMITTED LIGHT
Joseph Roman Ditzer, Jr., and Fred Walter Spangler, Rochester, N.Y., assignors to Eastman Kodak Company, Rochester, N.Y., a corporation of New Jersey
Continuation-in-part of application Ser. No. 435,573, Feb. 26, 1965. This application Mar. 6, 1967, Ser. No. 642,980
Int. Cl. G02b 27/30
U.S. Cl. 95—1            20 Claims

ABSTRACT OF THE DISCLOSURE

A mordanted element comprises a support which may be transparent or translucent having thereon at least two coatings, the first being a coating on the support containing a mordant and a pigment and a second coating over the first containing a mordant so that a dye image contained in the mordanted layers has the same visual appearance when viewed by reflected or transmitted light.

---

This application is a continuation-in-part of Ditzer et al. U.S. application Ser. No. 435,573, filed Feb. 26, 1965, now abandoned, and entitled "Color Image Transfer Prints for Viewing by Either Reflected or Transmitted Light."

This invention relates to photography, more particularly to positive color prints which may also be used as transparencies.

Color prints prepared photographically usually on a paper or pigmented support are well known. These color prints may be made by using a silver halide multilayer emulsion which is processed to provide a color print or they may be prepared on a mordanted surface such as by dye imbibition. In the latter process, a mordant is deposited in a colloid layer and the dye is transferred imagewise in successive steps using gelatin relief images which are prepared from separation negatives. In another embodiment, the color diffusion transfer process dyes are diffused imagewise onto the mordanted surface.

Color transparencies are also well known as evident from color slides and color motion picture film in which a positive color image is projected onto a screen. For some purposes, transparencies are prepared for back lighting by transmitted light, etc.

Since the transparencies are viewed by transmitted light, they require a greater dye density than photographic color prints which are viewed by reflected light. Therefore, color images have not been subject to viewing under both types of illumination. However, it has been highly desirable particularly for display color photographs, such as those used for outdoor advertising, to provide color prints which would be pleasing when viewed under both types of lighting.

We have found now a method of preparing color prints which can be viewed as a transparency by transmitted light as well as a print with reflected light. Approximately the same observed density can be obtained by both types of illumination.

One object of this invention is to provide a positive color image which can have the same apparent photographic properties when viewed by transmitted light or by reflected light. Another object is to provide a method of making a mordanted support for use in the dye imbibition or color diffusion transfer process, which can be used for viewing either by reflected or transmitted light. Other objects will be apparent from the following disclosure.

In carrying out our invention, we use a translucent or transparent support which has thereon at least two layers, the first layer on the support being pigmented and containing a mordant and the second layer being transparent. By transferring dyes imagewise to the pigmented mordanted layer, color images are obtained which have approximately the same density when viewed by transmitted or reflected light. The color images may be formed by various types of color image transfer processes. Examples of color image transfer processes which may be used are those in which azomethine and quinoneimine dyes are transferred to or are formed in the mordanted layer. Examples of such processes are described in Belgian Patents 585,686 and 603,747 and in U.S. Patent 2,756,142. Color image transfer processes involving the transfer of dye-developers, as described in U.S. Patent 2,983,606 also may be used, as well as basic dye transfer processes of the type described in U.S. Patent 2,713,305. Our invention is particularly useful with color prints made by the dye imbibition transfer process as described in Kodak Dye Transfer Process, 1951, published by the Eastman Kodak Company, Rochester, N.Y.

The attached drawing illustrates one embodiment of the invention. A support such as transparent cellulose acetate film base 12 has thereon as a first coating a layer 11 comprising a colloid, a mordant, and a light colored pigment. Over this pigmented coating 11 is an overcoating 10 containing a colloid and a mordant. On the reverse side of the support can be located a back coating 13 containing colloid and pigment. However, this back coating is not essential to the operation of the invention.

For some purposes, the support may also contain pigment in addition to having pigment in the first layer 11 on the support 12.

The support in our preferred embodiment is a dimensionally stable polymeric material such as polyethylene terephthalate, glass or the like. However, other supports which may be used include the conventional nonfibrous supports for silver halide emulsions such as the polyesters, polyamides, polystyrenes, polyacrylics, polyvinyls, cellulose esters, polyacetals, polyolefins, etc. For some purposes where the presence of fibers in the support is not detrimental, such as for large displays which are viewed from a distance, a fibrous material may be used such as a translucent paper, translucent fabric, etc.

The colloids which are useful in this invention include those which are water permeable such as those used for a vehicle in photographic emulsions. A particularly useful colloid is gelatin. Since this element is insensitive to light, other colloids may be used which are not particularly suitable for use in photographic emulsions. These include latexes and similar hydrophilic coatings which are water permeable and may be of natural or synthetic composition. Among the colloids other than gelatin which are useful are agar-agar, albumin, zein, collodion, polyvinyl alcohol, partially hydrolyzed polymeric acetals, and hydrophilic copolymers thereof with ethylenically unsaturated monomers, such as ethylene, vinyl chloride, etc., polyvinyl acetals, e.g. the acetals of polyvinyl alcohol with acetaldehyde or benzaldehyde, all water soluble or hydrophilic cellulose derivatives, etc. Suitable binders or water permeable colloids of the above types are described in U.S. Patents 2,110,491; 2,211,323; 2,276,322; 2,276,323; 2,286,-215; 2,397,866.

The pigments are not critical but include the light colored pigments customarily used for photographic purposes such as baryta, titanium dioxide, zinc oxide, etc.

The amount of pigment which is used will vary depending upon the composition of the pigment, the intensity of the illumination provided for viewing by transmitted light and the intensity of the illumination employed for viewing by reflective light. The minimum density for the pigment is the amount of pigment necessary to hide the dye. However, the amount of pigment used in the mordanted layer can be from about 100 mg./ft.² to 500 mg./ft.² depending upon the pigment. If titanium dioxide is employed as the pigment, the minimum amount would be about 200 mg./ft.². The density of the pigment which provides opacity to reflective light is at least 0.4 (measured by transmitted light). The density of the pigment can be as high as 2.0. However, the intensity of the light used for transmission purposes would necessarily be increased as the pigment densities become higher than 0.4 in order for the visual images by reflection and transmission to be the same. It will be appreciated that pigment may be contained in the support or in the back layer, and the densities of these pigments will be in addition to the minimum transmission density of 0.4 in the mordanted pigment layer.

The densities of the dye color print film are measured in the D max. areas. Each dye contributes from about 0.01 to about 2.0 in density by transmitted light. By reflected light, the density may range from about 0.01 to 1.5. These densities are measured apart from the densities of the pigmented layer. The densities referred to herein are measured on a standard densitometer such as Densitometer Model 1—Type RA–11–1 purchased from the Electrical Research Products, Inc. (ERPI). Various types of densitometers are referred to in Mees and James, "The Theory of the Photographic Process," third edition, 1966, The Macmillan Co., New York (pp. 420–430).

These densitometers use a standard source of illumination whereas in the practice of our invention the illumination is a variable. The illumination by reflective light may be from the sun and depend upon the weather. The source of light by transmission will be a matter of choice and might be a rheostat controlled electric lamp. Therefore, the actual values for pigment, mordant, etc., are determined within the scope of our invention on an empirical basis.

It will be appreciated that other methods known in the art for providing a white reflective surface may also be used providing sufficient light can be transmitted to view the dye image as a transparency. These methods must also be suitable for use with the hydrophilic binders which are used to carry the mordant in the first coating on the support. It will be appreciated, however, that if a back coating is used on the support which is rendered light reflecting, that this coating does not need to be hydrophilic nor water permeable. Blushed coatings may be used such as those disclosed in U.S. Patent 2,207,695. Various other methods may also be used such as those which result in the formation of gas cells or bubbles in a binder to provide a reflective surface.

In certain instances, the support may desirably be treated to render it more adherent to the coatings. For instance, the support may be electron bombarded or treated with some oxidizing means such as an oxidizing flame, a solution of sulfuric acid and potassium dichromate, ozone, chlorine gas, peroxide, etc. It may also be desirable to use a subbing on the support. The particular subbing material will, of course, depend upon the support used and is not critical to the invention. If desirable, dyes may also be used as well as whitening or fluorescent agents.

To improve reflection viewing, regardless of the viewing angle, a matting agent may be incorporated in the top overcoating layer. The matting agent should have an average size of 5–20 microns in diameter and may range in concentration from 0.010 to 0.050 g./ft.². The particular matting agent is not critical although silica is a useful material. Ground glass, starch particles, barium sulfate, polymeric beads, such as polymethyl methacrylate, etc. are also typical of those which may be used.

A particularly useful total amount of mordant in both layers may be from about 50 mg./ft.² to 500 mg./ft.². The mordant is balanced between the two top coatings on the support so that a major amount of the mordant is dispersed in the first coating on the support, the coating which also contains pigment. A minor amount of the mordant may be located in the overcoating over the pigmented reflecting layer. In our preferred embodiment, from 60 to 100% of the mordant is dispersed in the pigmented mordanted layer and over this layer is coated a nonpigmented transparent layer containing 0–40% of the mordant. Stated in another way, the amount of mordant in a particularly useful embodiment has a ratio of 1:2 to 1:25, preferably 1:5 to 1:10 parts by weight of the top layer to the pigmented mordanted layer. Thus, when the dye transfer is made, the dye is distributed in the layers so that sufficient dye is mordanted in the pigmented layer to provide density to transmitted light. The dye image in the pigmented layer is partly hidden during reflection viewing but the hidden dye adds to the density of the image when viewed with transmitted light.

The mordants which may be used include those which are known in the art. Particularly useful mordants are salts of polyvalent metals, polymeric mordants, combinations of these, and the like. The following patents, incorporataed herein by reference, disclose various mordants which are typical of those useful in our invention: U.S. 2,537,924; 2,548,575; 2,564,726; 2,583,076; 2,635,535; 2,635,536; 2,701,243; 2,713,305; 2,753,263; 2,882,156; 2,952,566; 3,048,487 and 3,075,841.

The following examples are intended to illustrate our invention but not to limit it in any way:

EXAMPLE 1

A color transfer print film was prepared having the following structure:

Pig gelatin (1,000 mg./ft.²) plus thorium acetate (10 mg./ft.²) plus silicon dioxide particles (35 mg./ft.²). Average particle size about 10 microns in diameter.
Pig gelatin (625 mg./ft.²) plus titanium dioxide (200 mg./ft.²) plus thorium acetate (75 mg./ft.²).
Polyethylene terephthalate film support.
Pig gelatin (1,130 mg./ft.²) plus titanium dioxide (625 mg./ft.²).

Similar materials were made in which all of the mordant was put in the top layer. These coatings were used as imbibition dye blanks in conjunction with Eastman matrix film as described on pages 43–45, Kodak Dye Transfer Process, 1951, published by the Eastman Kodak Company. The multicolored prints made from the coating contain the mordant distributed between the two layers had approximately equal density regardless of whether the print was viewed by reflection or transmission lighting. The other coatings had objectionably low contrast when viewed by transmission.

EXAMPLE 2

A color transfer print film was prepared having the following structure:

|  | Densities |
|---|---|
| Pig gelatin (1,000 mg./ft.²) plus thorium acetate (10 mg./ft.²) plus silicon dioxide particles (35 mg./ft.²). Average particle size about 10 microns in diameter. |  |
| Pig gelatin (615 mg./ft.²) plus titanium dioxide (225 mg./ft.²) plus thorium acetate (75 mg./ft.²) | 0.44 |
| Polyethylene terephthalate film support | .06 |
| Pig gelatin (113 mg./ft.²) plus titanium dioxide (625 mg./ft.²) | 0.62 |

The densities were measured by transmitted light before any dye had been imbibed into the layers.

The mordanted dye transfer receiving film of this invention can be used with color diffusion transfer systems wherein the dyes are diffused from the color film to a mordanted receiving sheet. Thus, the element of this invention can also be used for preparing photographic prints which are viewable either by reflected or transmitted light and which can be viewed by projection onto a screen, Therefore, it can be seen that this invention meets a need for color photographic reproduction which can be used as either conventional prints or as transparencies.

The invention has been described in detail with particular reference to preferred embodiments thereof, but it will be understood that variations and modifications can be effected within the spirit and scope of the invention as described hereinabove and as defined in the appended claims.

We claim:

1. A mordanted element capable of transmitting visible light comprising a support having thereon at least two coatings, a first coating on the support comprising a water permeable colloid having therein a light colored pigment and a mordant and having thereover a second coating of a transparent water permeable colloid containing a mordant.

2. A mordanted element of claim 1 in which the support is selected from the class consisting of transparent and translucent supports.

3. An element of claim 1 in which the first coating on the support comprises a water permeable dye absorber colloid having therein a light colored pigment.

4. An element of claim 1 in which the support is an organic polymeric material.

5. An element of claim 1 in which the said first coating contains 60–100% of the mordant and said second coating contains 0–40% of the mordant.

6. An element of claim 1 in which the said first coating contains from about 100 mg./ft.² to about 500 mg./ft.² of pigment.

7. An element of claim 1 in which the said first coating has a density of at least 0.4.

8. An element of claim 1 having on the other side of the support at least one coating containing a light colored pigment.

9. An element of claim 1 in which the said first coating on the support comprises a proteinaceous colloid and having thereon an overcoating of a proteinaceous colloid.

10. An element of claim 1 in which the second coating over the first contains a matting agent.

11. An element of claim 1 in which the said first coating on the support comprises gelatin and having thereon an overcoating comprising gelatin.

12. A colored element adapted to give substantially the same visual appearance by reflected and transmitted light comprising an organic polymeric support selected from the class consisting of transparent and translucent supports having thereon at least two coatings, the first being a coating on the support of a colloid containing a mordant and a pigment and a second coating over the first of a colloid.

13. An element of claim 12 in which the said first coating on the support comprises a proteinaceous colloid and having thereon an overcoating of proteinaceous colloid.

14. An element of claim 12 in which the said first coating contains 60–100% of the mordant and the second coating contains 0–40% of the mordant.

15. An element of claim 12 having on the other side of the support at least one coating containing a light colored pigment.

16. An element of claim 12 in which the said first coating contains from about 100 mg./ft.² to about 500 mg./ft.².

17. An element of claim 12 in which the said coatings have gelatin vehicles.

18. An element of claim 12 in which the density of the said first coating is at least 0.4.

19. An element of claim 12 in which the density of the element by transmitted light is substantially the same as the density by reflected light using illumination of substantially equal intensities.

20. An element of claim 12 in which the color is imbibed into the element by the photographic diffusion transfer process.

References Cited

UNITED STATES PATENTS 2,578,282    12/1951    Bliss _____ 95—1

JOHN M. HORAN, Primary Examiner